United States Patent [19]

Lesk et al.

[11] 4,094,078

[45] June 13, 1978

[54] PARTICLE FEEDING AND TREATING SYSTEM

[75] Inventors: Adolf Lesk; Wolfgang Hageleit, both of Osterburken, Germany

[73] Assignee: Ingenieur-Boero, Osterburken, Germany

[21] Appl. No.: 667,822

[22] Filed: Mar. 17, 1976

[30] Foreign Application Priority Data

Mar. 19, 1975 Germany .......................... 2511996

[51] Int. Cl.² .......................................... F26B 21/06
[52] U.S. Cl. .......................... 34/181; 34/191; 34/217; 34/241; 156/306; 428/137
[58] Field of Search ............... 34/181, 164, 191, 217, 34/232, 241, 57, 57 C; 156/306, 307; 428/137, 138

[56] References Cited

U.S. PATENT DOCUMENTS

| 2,795,318 | 6/1957 | Morris | 34/164 |
| 3,206,865 | 9/1965 | McEntee, Jr. | 34/57 A |
| 3,654,060 | 4/1972 | Goldman | 428/137 |
| 3,870,041 | 3/1975 | Dravies | 128/156 |

Primary Examiner—John J. Camby
Assistant Examiner—Larry I. Schwartz

[57] ABSTRACT

A feeding apparatus has a vessel with a floor on which is provided a support lining defining with the floor a generally closed space and constituted as a gas-impervious foil formed with a multiplicity of throughgoing holes and a gas-pervious textile sheet bonded to the foil over the holes. A blower serves to inject gas into the space and suck it therefrom and means is provided for withdrawing fluent particulate material from the vessel adjacent the lining. The gas injected under the lining serves partially to fluidize the bed and also to flex the lining so that the bed of particulate material thereon is loosened and can be withdrawn from the vessel.

13 Claims, 6 Drawing Figures

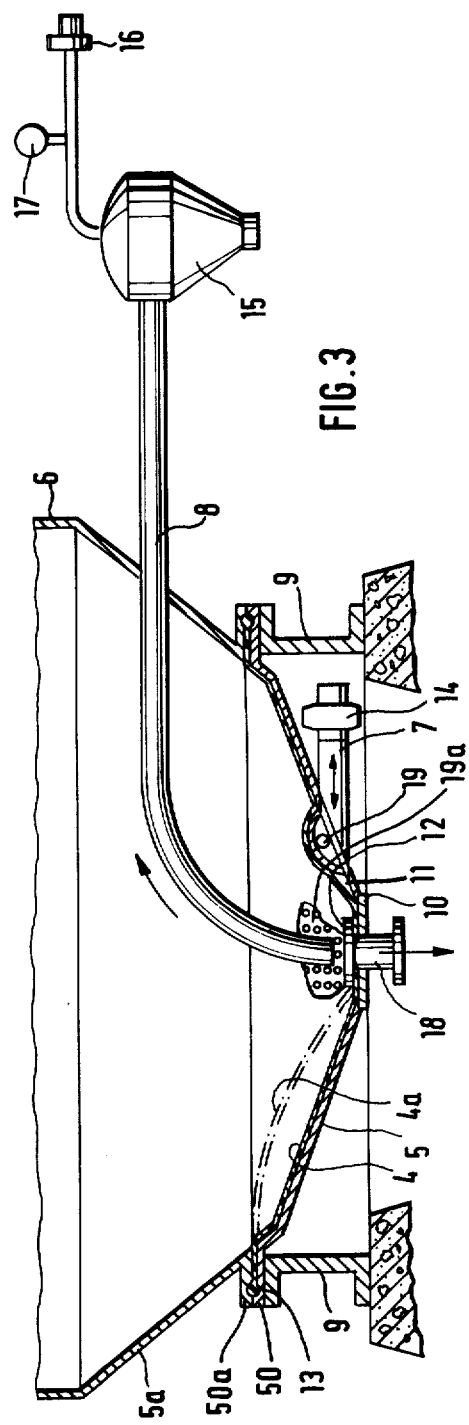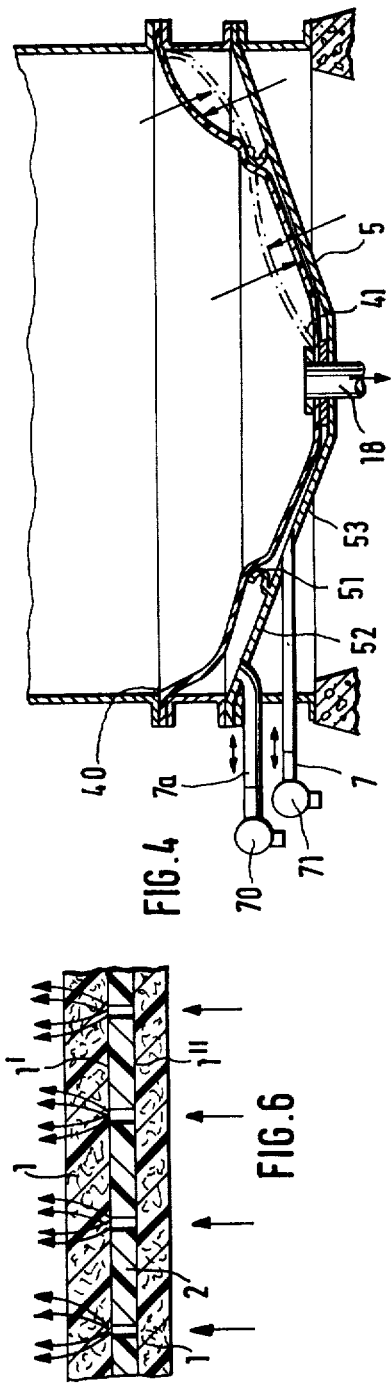

PARTICLE FEEDING AND TREATING SYSTEM

BACKGROUND OF THE INVENTION

The present invention relates to a feeding system. More particularly, this invention concerns a feeding apparatus as well as a method of feeding particulate material and a support lining for a feeding apparatus.

It is known to support a fluid particulate material in a vessel on a gas-pervious floor. Gas is forced upwardly through this floor so as to loosen the particulate material and even dry it. This upwardly flowing gas increases the fluidity of the particulate material and makes it easier to withdraw the material from the vessel. Such arrangements are used in feed hoppers and chemical plants, in silos, and in other arrangements wherein the particulate material is not sufficiently fluent to flow all by itself, particularly where the particulate material is sticky or tends to pack or arch.

The floor of such devices is, therefore, usually made of a rigid foraminous sintered metal plate or synthetic-resin body formed with perforations. With such rigid support elements it is possible to achieve very even resistance to throughflow of gas so that the process can easily be controlled.

The idea of using a flexible support sheet has been suggested. This, however, has been found to be inadequate due to the uncontrollable resistance to throughflow of gas of flexible support sheets, formed, for instance, of a felted textile or the like. Since the resistance to throughflow of gas is very low it would be necessary to provide an enormous blower in order adequately to physically displace the sheet on which lies a bed of particulate material that must be loosened. Thus the first cost and running costs of such an installation are very large.

In order to limit the resistance to gas throughflow in such flexible sheets it is necessary to increase their thickness considerably. This has the concomitant effect of increasing the rigidity of the sheet and making it more difficult to deflect it and thereby loosen the material on it.

SUMMARY OF THE INVENTION

It is therefore an object of the present invention to provide an improved feeding apparatus.

Another object of this invention is the provision of an improved method of treating and feeding a particulate material.

Yet another object is to provide an improved support element or lining usable in a feeding apparatus as described above.

A further object is to provide an improved method of making such an article of manufacture usable as a support lining in a feeding system.

Another object is to provide an improved system which overcomes the above-given disadvantages.

These objects are attained according to the present invention in an arrangement using a support element comprised as a gas-impervious flexible foil formed with a multiplicity of throughgoing holes, and a gas-pervious flexible textile sheet secured to the foil over the holes. Thus, a fluid can pass in at least one direction through the article, passing through the holes in the gas-impervious foil and then disseminating through the gas-pervious sheet secured thereover.

With such a system it is possible to make a relatively thin and flexible sheet which, nonetheless, offers resistance to throughflow of gas of such a high order that the element can readily be deflected by injecting air or another fluid into the space under it. In effect the aggregate cross-sectional area of the holes in the flexible foil has no effect on the resistance to flow, effected almost solely by the resistance to flow of the sheet secured thereover. Nonetheless, the gas-pervious sheet covering the hole causes the jets of gas arising from the holes to be spread out in the body of particulate material being loosened.

According to this invention the holes are each at most 4 $mm^2$ in flow cross section and are spaced apart by a distance of at most 20 mm. The sheet secured to the thus-perforated foil is fibrous.

This support element is formed in accordance with the present invention by gluing the gas-pervious or flexible textile sheet to the gas-impervious foil. It is also possible in accordance with this invention to apply a filament to the face of the sheet or the foil, then juxtapose the sheet foil, and finally allow the solvent to evaporate the sheet foil, and finally allow the solvent to evaporate so that the dissolved portion of the sheet or foil integrates with the other element and bonds the two tightly together. It also lies within the scope of this invention to heat the sheet or the foil, juxtapose them, and cool the sheet and foil so that they harden together.

The apparatus in accordance with this invention comprises a vessel having a floor, means for withdrawing a fluid particulate material from the vessel adjacent the floor, a support lining as described above, and blower means for injecting a gas into the space between the lining and the floor. Thus the material is loosened by the gas passing through the holes in the foil and disseminating through the sheet.

In accordance with this invention the lining thus formed is annular and has inner and outer peripheries secured in gas-tight fashion to the vessel so that the space into which gas or liquid is injected is similarly annular and lies between the peripheries and underneath the lining. In such an arrangement the gas-pervious sheet is turned toward the material being fed and the foil is turned toward the floor.

It is possible with the system in accordance with this invention alternately to inject gas into the space under the support lining and withdraw it so that this lining flexes upwardly and downwardly and serves physically to loosen the material sitting on it. Furthermore, it is possible according to this invention to subdivide the space into two chambers or subspaces and alternately to inflate and deflate these chambers so as to agitate the material sitting on the support lining.

According to further features of this invention the support lining may be used to dry the material sitting on it. To this end it may simply be provided in the bottom of a feed trough or chute that is inclined to the horizontal so that material charged into the upper end of the feed trough or chute is loosened and dried as it flows toward the lower end thereof.

According to another feature of this invention the foil is sandwiched between two gas-pervious sheets.

Thus with the arrangement in accordance with this invention it is possible to loosen the particulate material sitting on the lining both by at least partially fluidizing it with an upwardly passing gas or liquid stream, and to also physically agitate it by displacing the lining on which the bed of particulate material lies. The resistance to throughflow of gas by the material is almost entirely determined by the resistance of the gas-pervious sheet overlying the gas impervious foil, yet the enormous flexibility and durability of the lining can be ascribed to this foil on which the gas-pervious sheet is secured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a side schematic view of a feed apparatus in accordance with the present invention;

FIG. 4 is a vertical section through another feed apparatus according to the present invention;

FIG. 6 is a section similar to FIG. 1 through another article of manufacture according to the present invention.

DESCRIPTION OF PREFERRED EMBODIMENTS

Figure 1:
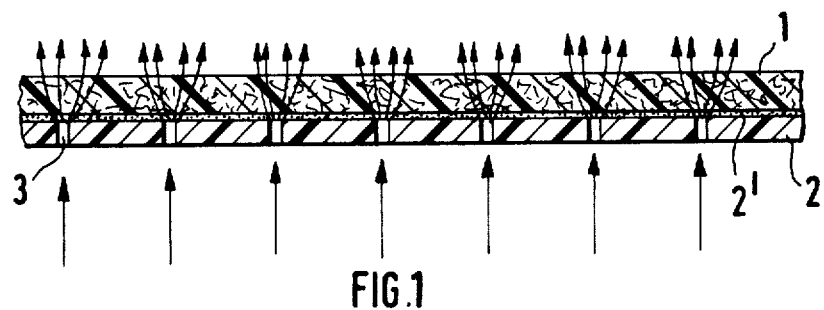
FIG. 1 is a cross section through an article of manufacture in accordance with this invention.
Figure 2:
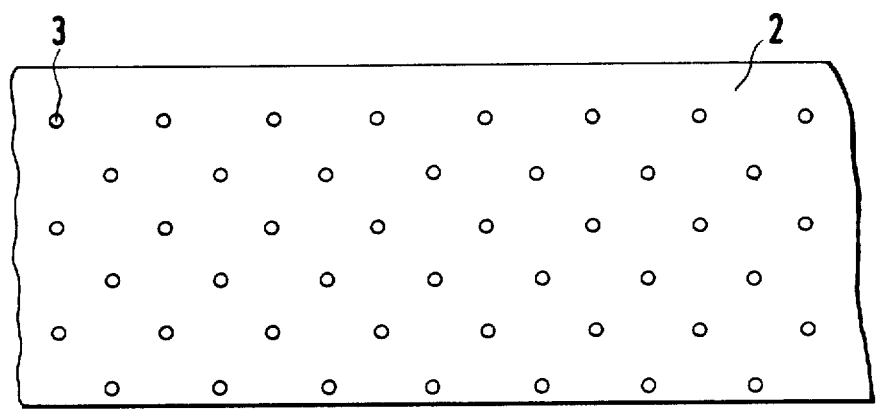
FIG. 2 is a top view of the article of FIG. 1.

As shown in FIGS. 1 and 2 a support lining according to the present invention comprises a gas-impervious synthetic-resin foil 2 overlain by a gas-pervious textile sheet 1 and formed with a multiplicity of throughgoing holes 3. A glue joint 2' secures the two elements 1 and 2 together.

As shown by the arrows gas may be applied under pressure to the foil side of the element so that after passing through the foil 2 jets are formed which permeate through the sheet 1. The resistance to throughflow of gas of the element is almost exclusively determined by the resistance offered by the textile sheet 1. A tightly woven, felted, or knitted sheet 1 will have a high resistance and a loosely woven, knitted, or felted sheet 1 will have a low resistance to gas throughflow. The sheet 1 may be formed of a polyester or a polyamide as well as a natural product such as wool. It is important that it has a tensile strength of 50 kg in a width of 1 cm. Normally a sheet 1 having a thickness between 0.2 mm and 1.0 mm is used. The foil may be made of a polyvinyl chloride, polyethylene, polystyrene, rubber, and like flexible materials and has a thickness of between 0.1 mm and 0.3 mm. The holes are formed in this foil 2 by stamping, burning, or punching. In accordance with the present invention the holes 3 are arrayed at a density of 140 holes per $dcm^2$. In this type of arrangement the gas throughflow is approximately 1 $m^3$ per minute per square meter with a resistance of 100 mm water column. With such a structure the shape or flexion of the liner element does not change its resistance to gas throughflow.

FIG. 6 shows another arrangement wherein two such sheets 1 are secured to a central foil 2. The foil 2 is made of polyvinyl chloride and is heated on one side at 1' to approximately 160° and united with the one sheet 1 to form a thermal joint. On its other side it is treated with a solvent such as carbon tetrachloride and the polyester sheet 1 is applied thereto to form a solvent joint 1''. The sheets 1 in this arrangement are of the fabric sold under the brand name Trevira.

It also lies within the scope of this invention to secure the sheet 1 and foil 2 together by means other than a glue joint 2', a thermal joint 1', or a solvent joint 1''. Thus, in particular in installations where a small surface area of the linear element 1, 2 is needed, it is possible merely to press the sheet 1 down on the foil 2. A screen or the like can thus be used to press this sheet 1 down on the foil 2 and ensure a tight contact therebetween so that in effect the two elements are united.

In accordance with this invention as shown in FIGS. 1 and 6 the holes 3 have a cross-sectional area of at most 4 $mm^2$. They are spaced apart according to the thickness of the foil 2 by a distance of no more than 10 mm to 20 mm. The upper surface of the sheet 1, which is of fibrous material in FIG. 1, is roughened.

It is also possible to replace the unitary foil 2 with a foil 2 made out of criss-crossed strips of flexible and gas-impervious synthetic-resin material. In such an arrangement the small spaces formed at the crossover points will constitute the holes 3. It is also possible simply to layer on one side of the sheet 1 gas-impervious perforated sheets that together form the foil 2.

FIG. 3 shows an arrangement according to the present invention wherein a liner 4 formed as shown in FIGS. 1 and 2 is received in the bottom region 5 of a cylindrical vessel 6 having a lower region 5a that tapers downwardly less sharply than the floor 5 over which the element 4 is provided. The lower region 5a has a flange 50a which rests on a flange 50 at the upper end of the floor 5 that in turn rests on a C-section support ring 9. A seal 13 is provided and the flanges 50 and 50a are bolted together so that the outer periphery of the annular liner 4 is secured in gas-tight fashion between the lower region 5a and the floor 5. At the very bottom of the downwardly frusto-conically tapered floor 5 there is provided a central axis-defining and downwardly open outlet conduit 18. In addition and/or alternatively immediately above this outlet conduit 18 is the mouth of another conduit 8 that extends upwardly and out through a cyclone 15 from the vessel 6. The inner periphery 11 of the annular lining 4 is clamped between a disc 12 and the upper end of the outlet pipe 18.

A reversible blower 14 is connected via a conduit 7 to a perforated manifold pipe 19 lying in the space between the floor 5 and the liner 4. This blower 14 is operated as shown by the dot-dash line through a controller 26 also connected to a pressure gauge 17 between the output side of the cyclone 15 and the suction side of the compressor 16 connected thereto. It is therefore possible for the blower 14 to inject air into the space under the lining 4 and cause it to assume the position shown at 4a in FIG. 3. Periodic pulsating reversing of the blower 14 makes it possible to agitate the bed of particulate material laying on top of the liner 4 by moving it between the position shown at 4a and a position lying directly on the floor 5.

The controller 26 serves to shut off the blower 14 when a predetermined subatmospheric pressure in the cyclone 15 has been exceeded. This arrangement therefore ensures that the material would be picked up properly and separated out in the cyclone 15.

The manifold ring 19 can be replaced by a frustoconical perforated sheet 19a forming part of the floor 5, or by other arrangements for distributing the air feed to the space underneath the liner 4. In addition the output holes in the manifold 19 or the perforated sheet 19a may be directed either parallel to the floor 5, or directly at the liner 4, or even at an angle inclined to these two directions.

With the arrangement in FIG. 4 the liner 4 has its outer periphery 40 and inner periphery 41 secured as shown in FIG. 3. Here, however, there is provided in the middle of the frusto-conical floor 5 another ring 51 secured to an intermediate annular zone of the liner 4 and forming separate subspaces or chambers 52 and 53. Individual conduits 7a and 7 provided with reversible blowers 70 and 71 are connected to the spaces 52 and 53 and are automatically operated so as to inject air into the one space while withdrawing it from the other and vice versa. Thus it is possible to change as shown to the right in FIG. 4 the angle of inclination of the lower end of the receptacle 6 in order to ensure good feeding of the material therein toward the outlet hole 18'.

Figure 5:
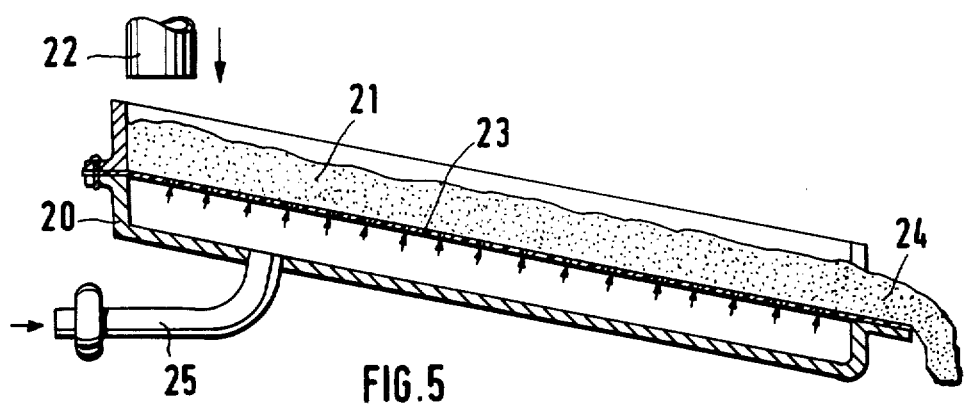
FIG. 5 is a vertical section through a particle-treatment arrangement in accordance with the present invention.

Finally, FIG. 5 shows a trough 20 inclined to the horizontal and provided with a screen 27 supporting a sheet 23 as described with reference to FIGS. 1 and 2. A feed device 25 forces air into the space under the sheet 23 so that a bed 21 of particulate material thereon advances from a feed conduit 22 at the upper end of the trough 20 to an outlet hole 24 at the lower end thereof. The air fed in by the arrangement 25 not only serves to loosen the bed 21 and make it more fluent, but also serves to dry this bed 21. The gas passing upwardly through the bed 21 may be inert or serve to process this bed 21.

It will be understood that each of the elements described above, or two or more together, may also find a useful application in other types of systems differing from the types described above.

While the invention has been illustrated and described as embodied in a feeding system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A feeding apparatus comprising, in combination:
a vessel having a floor;
means for withdrawing fluent particulate material from said vessel adjacent said floor;
a flexible support lining in said vessel on said floor defining therewith a generally closed variable-volume space and constituted as a gas-impervious foil formed with a multiplicity of throughgoing holes and a gas-pervious textile sheet bonded to said foil over said holes; and
blower means for injecting a gas into said space and thereby flexing said lining, whereby said material is loosened by said gas passing through said holes in the foil and disseminating through said sheet.

2. The apparatus defined in claim 1 wherein said holes are at most 4 mm$^2$ in section and are spaced by a distance of at most 20 mm.

3. The apparatus defined in claim 1 wherein said foil is sandwiched between two such sheets.

4. The apparatus defined in claim 1, further comprising an adhesive securing said sheet to said foil.

5. The apparatus defined in claim 1 wherein said holes are at most 4 mm$^2$ in flow cross-section and are spaced apart by a distance of at most 20 mm.

6. The apparatus defined in claim 1 wherein said sheet is fibrous and has one face turned toward and secured to said foil and another face with roughened outwardly projecting fibers.

7. The apparatus defined in claim 1 wherein said sheet is turned toward said material and said foil is turned toward said floor.

8. The apparatus defined in claim 7 wherein said floor is provided with a plurality of outlets connected to said blower means.

9. A feeding apparatus comprising, in combination:
a vessel having a floor;
means for withdrawing fluent particulate material from said vessel adjacent said floor;
an annular support lining in said vessel on said floor and having inner and outer peripheries secured to said vessel, said lining defining between said peripheries, underneath said lining and with said vessel a generally closed annular space, said lining further being constituted as a gas-impervious foil formed with a multiplicity of throughgoing holes and a gas-pervious textile sheet bonded to said foil over said holes; and
blower means for injecting a gas into said space, whereby said material is loosened by said gas passing through said holes in said foil and disseminating through said sheet.

10. A feeding apparatus comprising, in combination:
a vessel having a downwardly tapering floor and having immediately above said floor a lower region tapered downwardly more than said floor;
means for withdrawing fluent particulate material from said vessel adjacent said floor;
a support lining in said vessel on said floor defining therewith a generally closed space and constituted as a gas-impervious foil formed with a multiplicity of throughgoing holes and a gas-pervious textile sheet bonded to said foil over said holes; and
blower means for injecting a gas into said space, whereby said material is loosened by said gas passing through said holes in said foil and disseminating through said sheet.

11. A feeding apparatus comprising, in combination:
a vessel having a floor and an upper part and a lower part joined at a horizontal joint;
means for withdrawing fluent particulate material from said vessel adjacent said floor;
a support lining in said vessel on said floor defining therewith a generally closed space and constituted as a gas-impervious foil formed with a multiplicity of throughgoing holes and a gas-pervious textile sheet bonded to said foil over said holes, said lining having an outer edge clamped between said parts at said joint; and
blower means for injecting a gas into said space, whereby said material is loosened by said gas passing through said holes in said foil and disseminating through said sheet.

12. A feeding apparatus comprising, in combination:
a vessel having a floor;
means for withdrawing fluent particulate material from said vessel adjacent said floor;

a support lining in said vessel on said floor defining therewith a generally closed space and constituted as a gas-impervious foil formed with a multiplicity of throughgoing holes and a gas-pervious textile sheet bonded to said foil over said holes; and blower means for injecting a gas into said space and withdrawing gas from said space, whereby said material is loosened by said gas passing through said holes in said foil and disseminating through said sheet.

13. A feeding apparatus comprising, in combination:

a vessel having a floor;

means for withdrawing fluent particulate material from said vessel adjacent said floor;

an annular lining in said vessel on said floor and having generally concentric inner and outer peripheries secured to said vessel, said lining defining with said floor a generally annular space between said peripheries and being constituted as a gas-impervious foil formed with a multiplicity of throughgoing holes and a gas-pervious textile sheet bonded to said foil over said holes;

means for securing said lining to said floor along an annular zone between said peripheries for subdividing said space into two annular subspaces; and blower means for injecting a gas into one of said subspaces and for withdrawing a gas from the other subspace and thereafter withdrawing said gas from said one subspace and feeding a gas to said other subspace, whereby said material is loosened by said gas passing through said holes in said foil and disseminating through said sheet.

* * * * *

UNITED STATES PATENT AND TRADEMARK OFFICE
CERTIFICATE OF CORRECTION

PATENT NO. : 4,094,078
DATED : June 13, 1978
INVENTOR(S) : Adolf Lesk et al.

It is certified that error appears in the above-identified patent and that said Letters Patent are hereby corrected as shown below:

[30], the Foreign Application Priority Data should read

-- Mar. 19, 1975   Germany................2511996

Jan. 23, 1976   Germany................2602486 --.

Signed and Sealed this

Thirtieth Day of January 1979

[SEAL]

Attest:

RUTH C. MASON
*Attesting Officer*

DONALD W. BANNER
*Commissioner of Patents and Trademarks*